US008640587B2

(12) United States Patent
Cheung et al.

(10) Patent No.: US 8,640,587 B2
(45) Date of Patent: Feb. 4, 2014

(54) HAND-OPERATED CUTTING APPARATUS

(75) Inventors: Yiu Joe Cheung, Fotan (HK); Chung Wai Stephen Chan, Fotan (HK)

(73) Assignee: Cosso International Ltd., Fotan N.T. (HK)

( * ) Notice: Subject to any disclaimer, the term of this patent is extended or adjusted under 35 U.S.C. 154(b) by 1135 days.

(21) Appl. No.: 12/495,094

(22) Filed: Jun. 30, 2009

(65) Prior Publication Data

US 2010/0095821 A1 Apr. 22, 2010

(30) Foreign Application Priority Data

Oct. 20, 2008 (HK) ................................ 08111575.2

(51) Int. Cl.

| | |
|---|---|
| ***B23D 7/06*** | (2006.01) |
| ***B23D 1/00*** | (2006.01) |
| ***B23D 15/00*** | (2006.01) |
| ***B23D 25/00*** | (2006.01) |
| ***G05G 1/00*** | (2008.04) |

(52) U.S. Cl.

USPC ........... 83/435.19; 83/437.6; 83/457; 83/679; 83/857; 74/577 M

(58) Field of Classification Search

USPC ............... 83/435.19, 435.11, 435.13, 435.15, 83/679, 437.6, 437.5, 856, 857, 858, 629, 83/457; 74/575, 587, 577 M, 578; 99/538, 99/545; 29/281.1, 43, 246; 269/246, 43, 269/45

See application file for complete search history.

(56) References Cited

U.S. PATENT DOCUMENTS

| | | | | |
|---|---|---|---|---|
| 223,129 | A * | 12/1879 | Garst | 83/437.6 |
| 433,292 | A * | 7/1890 | Lasher | 83/437.6 |
| 1,947,153 | A * | 2/1934 | Dellinger | 83/435.18 |
| 2,074,337 | A * | 3/1937 | Krag | 99/573 |
| 2,283,029 | A * | 5/1942 | Bakewell | 83/435.19 |
| 2,283,030 | A | 5/1942 | Bakewell | |
| 3,273,613 | A * | 9/1966 | Craven | 33/450 |
| 5,188,024 | A | 2/1993 | Li | |

(Continued)

FOREIGN PATENT DOCUMENTS

| | | |
|---|---|---|
| CN | 87201245 | 2/1988 |
| CN | 2080446 | 7/1991 |

(Continued)

*Primary Examiner* — Kenneth E. Peterson
*Assistant Examiner* — Samuel A Davies
(74) *Attorney, Agent, or Firm* — Hasse & Nesbitt LLC; Daniel F. Nesbitt

(57) ABSTRACT

A hand-operated cutting apparatus including a main frame at least including a front wall, a base wall and two side walls, in which an opening is formed in the front wall, and a rack formed on an upper surface of the base wall along the length of the main frame, a bracket disposed between the side walls of the main frame and movable along the length of the main frame, a cutter provided in the front of the main frame and including a cutting blade located within the opening, and a squeezer attached to the front surface of the bracket facing to the cutter. The bracket includes a base, a handle pivotally provided on the base and a pusher arm pivotally provided on the handle, in which a lower end of the pusher arm is located between two teeth of the rack, and the pivot axis of the pusher arm on the handle departs from the pivot axis of the handle on the base towards the rear of the main frame.

16 Claims, 6 Drawing Sheets

(56) References Cited

U.S. PATENT DOCUMENTS

| | | | | |
|---|---|---|---|---|
| 5,245,902 | A | 9/1993 | Pereira | |
| 5,520,105 | A * | 5/1996 | Healy | 100/98 R |
| 2009/0272281 | A1 * | 11/2009 | Hood et al. | 99/538 |

FOREIGN PATENT DOCUMENTS

| | | |
|---|---|---|
| CN | 2104106 | 5/1992 |
| CN | 2558497 | 7/2003 |
| CN | 2730585 | 10/2005 |
| JP | 2000189331 | 7/2000 |

* cited by examiner

HAND-OPERATED CUTTING APPARATUS

FIELD OF THE INVENTION

The present invention relates to a cutting apparatus, and more particularly, to a hand-operated cutting apparatus for cutting objects into desired strips or particles.

BACKGROUND OF THE INVENTION

Traditionally, to cut objects, for example food, into desired strips or particles, a knife is needed. However, such kind of cutting operation is time-consuming and laborious, and the resultant shapes and sizes of the objects are not uniform.

In order to overcome the above problems, some special cutting apparatuses have been proposed to cut objects into stripes. The operation of such special cutting apparatuses is as follows. The objects to be cut are placed between a fixed knife and a movable squeezer, and then the squeezer is pushed towards the knife to enable the cutting of the objects with the knife. Such kind of special cutting apparatuses may control the resultant shape of the objects, however, the operation of such apparatuses is still laborious.

SUMMARY OF THE INVENTION

With respect to the above-mentioned problems, a main aspect of the present invention is to provide a hand-operated cutting apparatus, which comprises: a main frame at least including a front wall, a base wall and two side walls, in which an opening is formed in the front wall, and a rack is formed on an upper surface of the base wall along the length of the main frame; a bracket being disposed between the side walls of the main frame and movable along the length of the main frame; a cutter provided in the front of the main frame and comprising a cutting blade located within the opening; and a squeezer attached to the front surface of the bracket facing to the cutter; in which the bracket comprises a base, a handle pivotally provided on the base and a pusher arm pivotally provided on the handle, and a lower end of the pusher arm is located between two teeth of the rack, and the pivot axis of the pusher arm on the handle departs from the pivot axis of the handle on the base towards the rear of the main frame.

Preferably, a sliding groove may be formed on the inner surface of each side wall along the length of the main frame, and the base may include a main body and side plates extending backwards from both sides of the main body, in which a sliding block is formed on the outer surface of each of the side plates for engaging with the respective sliding groove.

The handle may comprise a pressing piece and a leg inclinedly extending from the lower side of the pressing piece towards the front of the main frame, in which the handle is pivotally mounted on the base by means of a first pivot positioned at the front part of the leg, and the pusher arm is pivotally mounted on the leg by means of a second pivot positioned at the rear part of the leg. In addition, the hand-operated cutting apparatus may further comprise a first tension spring having a central hole mounted on the second pivot and two supporting rods pressing against the pusher arm and the leg, which tends to enlarge the included angle between the pusher arm and the leg.

Preferably, a retaining sheet may be formed on the leg near the upper end of the pusher arm. Therefore, when the included angle between the pusher arm and the leg is enlarged to a certain angle, the upper end of the pusher arm presses against the retaining sheet to prevent the included angle from being further enlarged.

For the convenience of the orientation of the bracket in the main frame, the hand-operated cutting apparatus may further comprise a stopper arm pivotally provided on the leg by means of the first pivot, and the lower end of which is located between two teeth of the rack. Furthermore, the hand-operated cutting apparatus may further comprise a second tension spring having a central hole mounted on the first pivot and two supporting rods pressing against the stopper arm and the leg, which tends to enlarge the included angle between the stopper arm and the leg.

Preferably, an end sheet is formed at the upper end of the stopper arm and is sized to cover the edge of the lower end of the leg. Therefore, when the included angle between the leg and the stopper arm is enlarged to a certain angle, the end sheet of the stopper arm presses against the edge of the lower end of the leg to prevent the included angle from being further enlarged.

To strengthen the present hand-operated cutting apparatus, the base may further comprise a central protrusion extending backwards from the center of the main body for supporting the first pivot.

The cutter may further comprise a stand, and the number of the cutting blades is two or more, in which the cutting blades are provided within the stand and cross each other to form apertures by adjacent cutting blades.

To attach the cutter in the front of the main frame, a circular groove may be formed in the front wall of the main frame around the opening, and at least one side of the circular groove is open to enable the insertion of the stand of the cutter, in which an aligning projection extends outwards from the stand, and an aligning aperture is formed at the side of the front wall opposite to the open side of the circular groove to enable the insertion of the aligning projection.

The squeezer may comprise a substrate and at least a squeezing pole extending forwards from the substrate and corresponding to the apertures formed by the cutting blades.

A set of upper connecting tabs may be formed at the top of the substrate opposite to the squeezing pole and upper projections may be formed at the end of the respective upper connecting tabs. A lower connecting tab may extend backwards from the lower part of each side of the substrate opposite to the squeezing pole and lower projections may extend upwards from the top of the respective lower connecting tabs. Recesses could be formed on the front surface of the bracket for the insertion of the corresponding upper connecting tabs, and a set of connecting holes may be formed at the top side of the bracket to align with the recesses for the insertion of the upper projections, and a rim is formed downwards from each side of the bracket to form a receiving recession with the other part of the bracket, in which the receiving recessions receive the lower projections of the squeezer.

In order to cut the resultant strips of the object squeezed from the cutter into a desired length, the present hand-operated cutting apparatus may further comprise a knife holder provided in front of the main frame and having a foundation and a couple of vertical columns extending upwards from the both sides of the foundation, in which the rear edge of each vertical columns is separated from that of the foundation.

The knife holder may further comprise an attaching plate extending from the lower side of the foundation for attaching to the bottom of the main frame. A coupling groove may be formed on the rear surface of the foundation, and a coupling projection extends outwards from the lower side of the front wall of the main frame for engaging with the coupling groove.

With the hand-operated cutting apparatus of the present invention, users may cut the objects step by step, therefore, the resultant size of the objects could be controlled perfectly, and the operation of the apparatus is convenient and labor saving.

BRIEF DESCRIPTION OF THE DRAWINGS

The above and/or other aspects and features of the present invention will be more apparent by describing the present invention in details with reference to the accompanying drawings. The components or parts in the figures are for illustration purposes only and are not drawn to scale, in which.

DETAILED DESCRIPTION OF THE INVENTION

Figure 1:
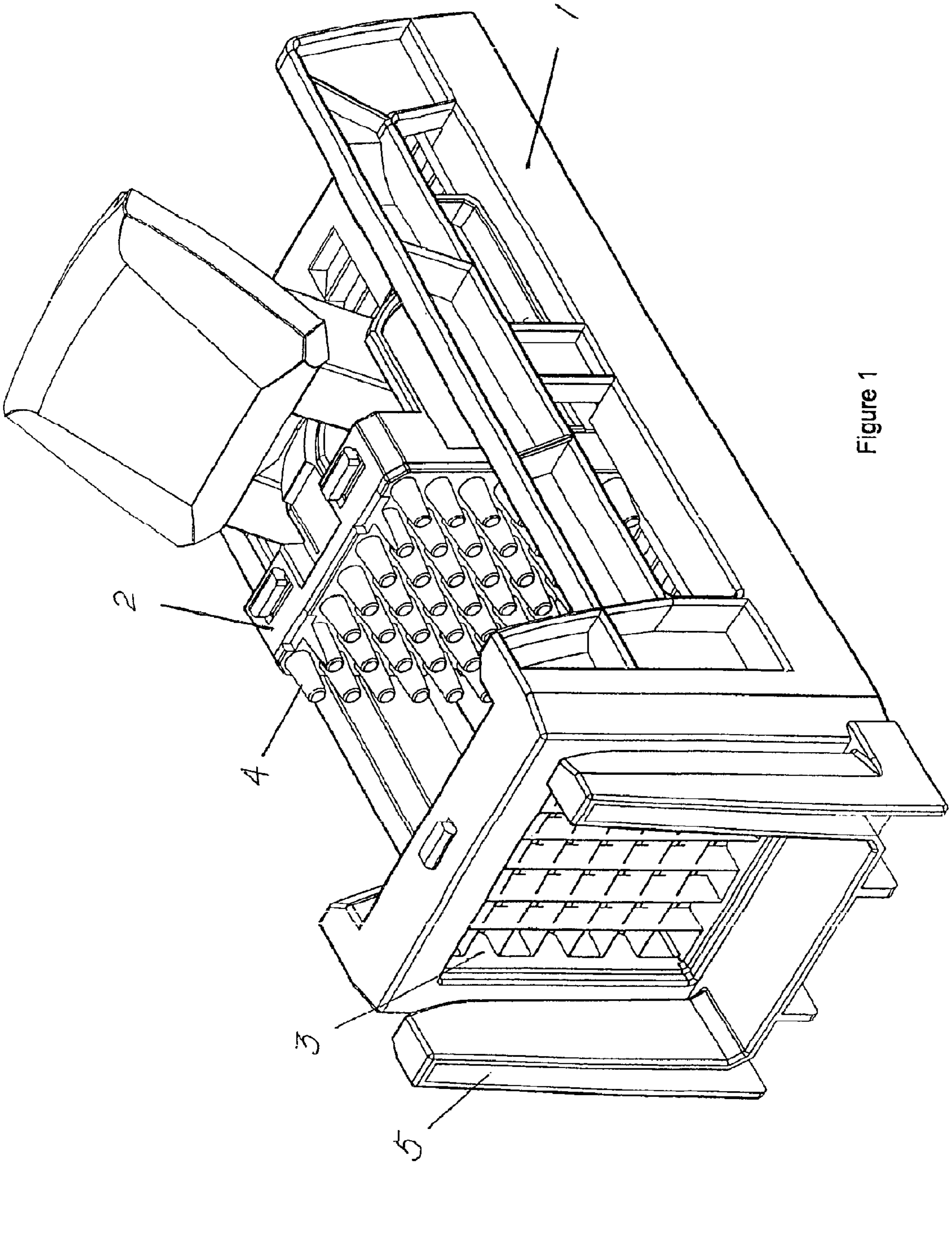
FIG. 1 is a perspective view of an embodiment of the hand-operated cutting apparatus according to the present invention.

FIG. 1 shows an embodiment of the hand-operated cutting apparatus of the present invention, which comprises a main frame 1; a bracket 2 disposed in the main frame 1 and movable along the length of the latter; a cutter 3 provided in the front of the main frame 1 and a squeezer 4 provided on the front surface of the bracket 2 facing to the cutter 3.

Figure 3:
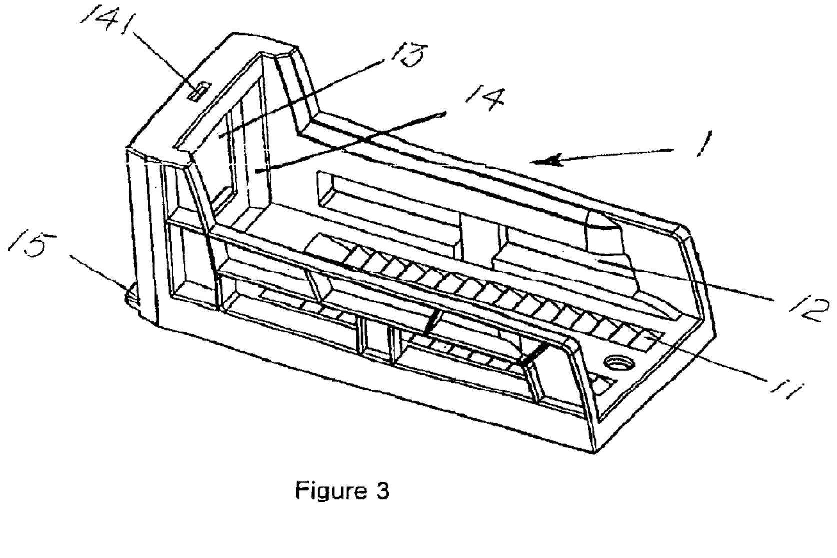
FIG. 3 is a perspective view of a main frame in the hand-operated cutting apparatus according to the present invention.
Figure 4:
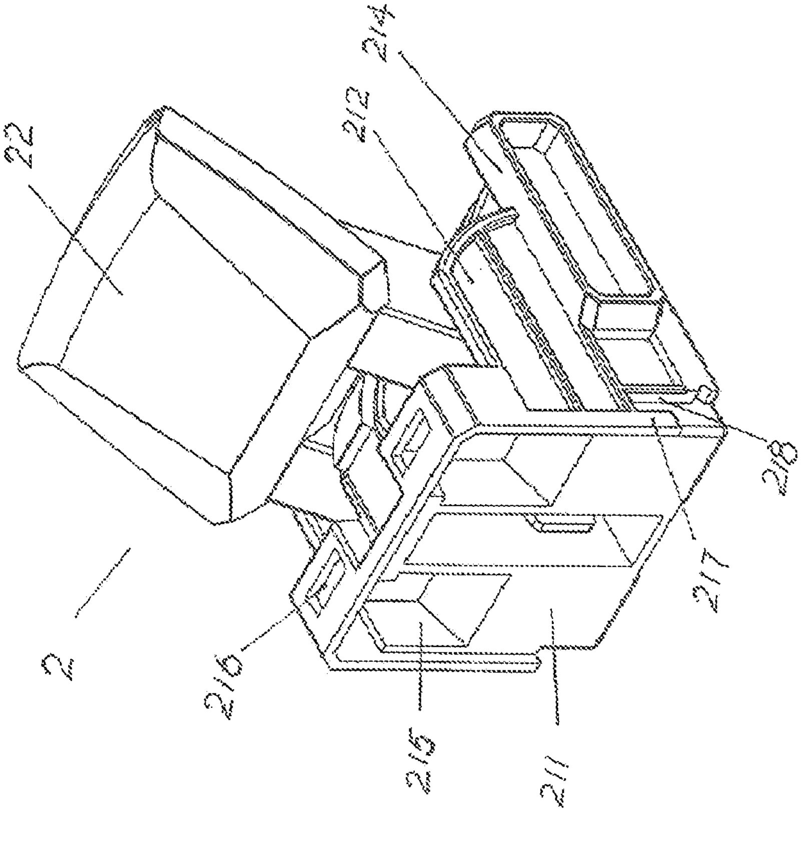
FIG. 4 is a perspective view of a bracket in the hand-operated cutting apparatus according to the present invention.
Figure 6:
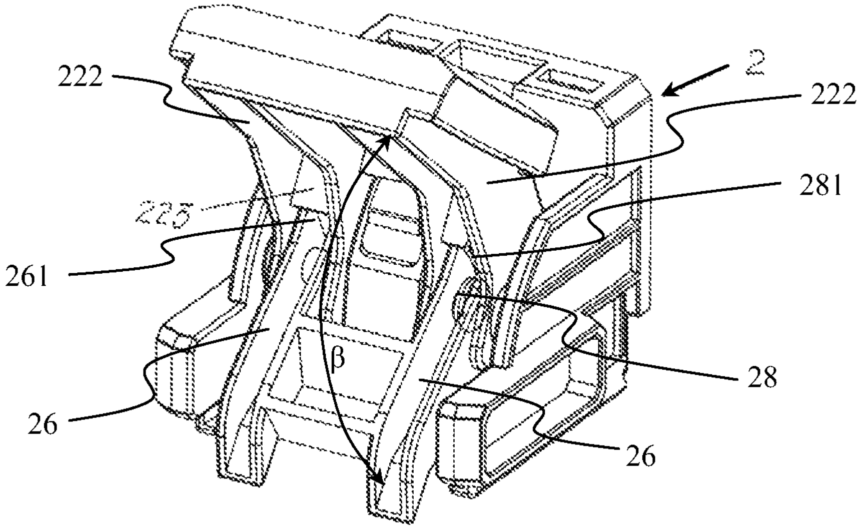
FIG. 6 is a perspective view of the bracket of FIG. 4 viewed from the rear side thereof.

As shown in FIG. 3, the main frame 1 at least includes a front wall, a base wall and two side walls, and the top end and rear end thereof may be open. A rack 11 is formed on the upper surface of the base wall along the length of the main frame 1. On the inner surface of each side wall, a sliding groove 12 could be formed along the length of the main frame 1, to guide individual sliding blocks 214 formed on the bracket 2 (see FIG. 4). An opening 13 is formed in the front wall, and cutting blades 32 of the cutter 3 are located within the limit defined by the opening 13, to enable the objects to pass through the opening 13 after the objects are cut by the cutting blades 32.

Figure 2:
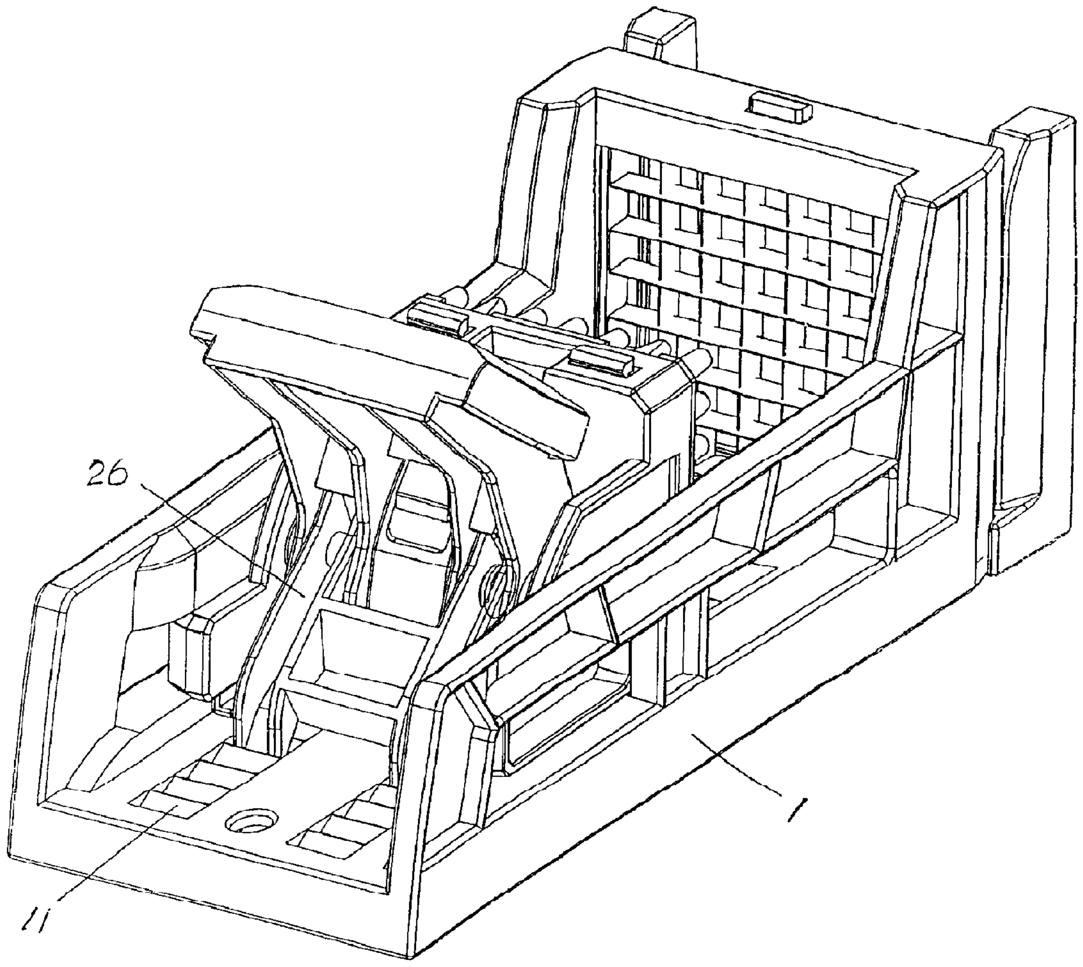
FIG. 2 is a perspective view of the embodiment of FIG. 1 viewed from another side.

FIGS. 4-7 show the bracket of the present invention, which comprises a base 21; a handle 22 pivotally provided on the base 21; a pusher arm 26 pivotally provided on the handle 22 and a lower end thereof being located between two teeth of the rack 11 (see FIG. 2).

The base 21 includes a main body 211; side plates 212 extending backwards from the both sides of the main body; and central protrusion 213 extending backwards from the center of the main body and spaced from the side plates. Each of the sliding blocks 214 is formed on the outer surface of each of the side plates and is engaged with the respective sliding grooves 12 to enable the base 21 to move along the sliding grooves 12.

The handle 22 includes a pressing piece 221 and a leg 222 inclinedly extending from the lower side of the pressing piece 221 towards the front of the main frame 1. The handle 22 is pivotally mounted on the base 21 by means of a pivot 24 passing through the front part of the leg 222. In the example shown in FIG. 7, the leg 222 have two branches spaced from each other and bridging the central protrusion 213 of the base 21 within the side plates 212.

Figure 5:
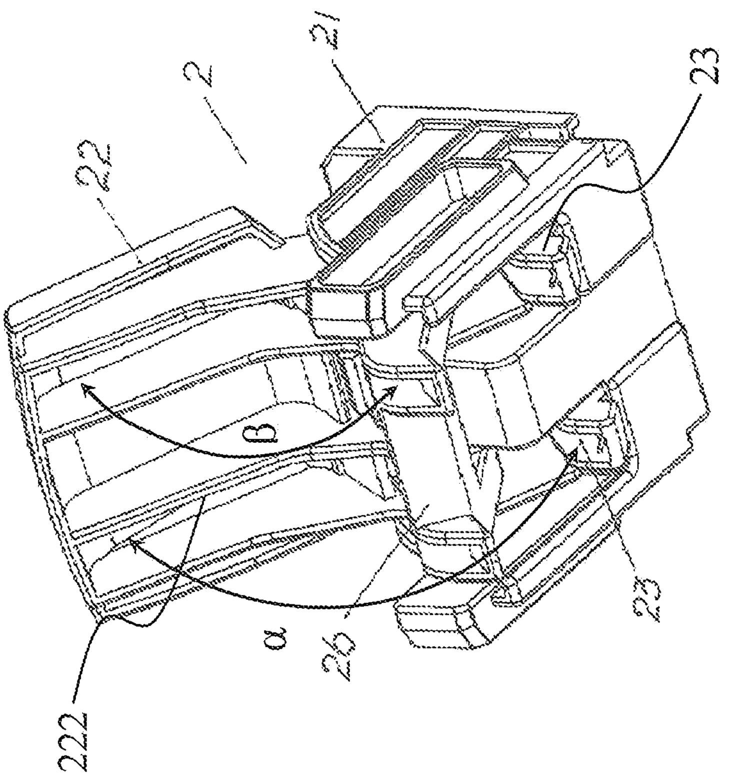
FIG. 5 is a perspective view of the bracket of FIG. 4 viewed from the lower side thereof.
Figure 7:
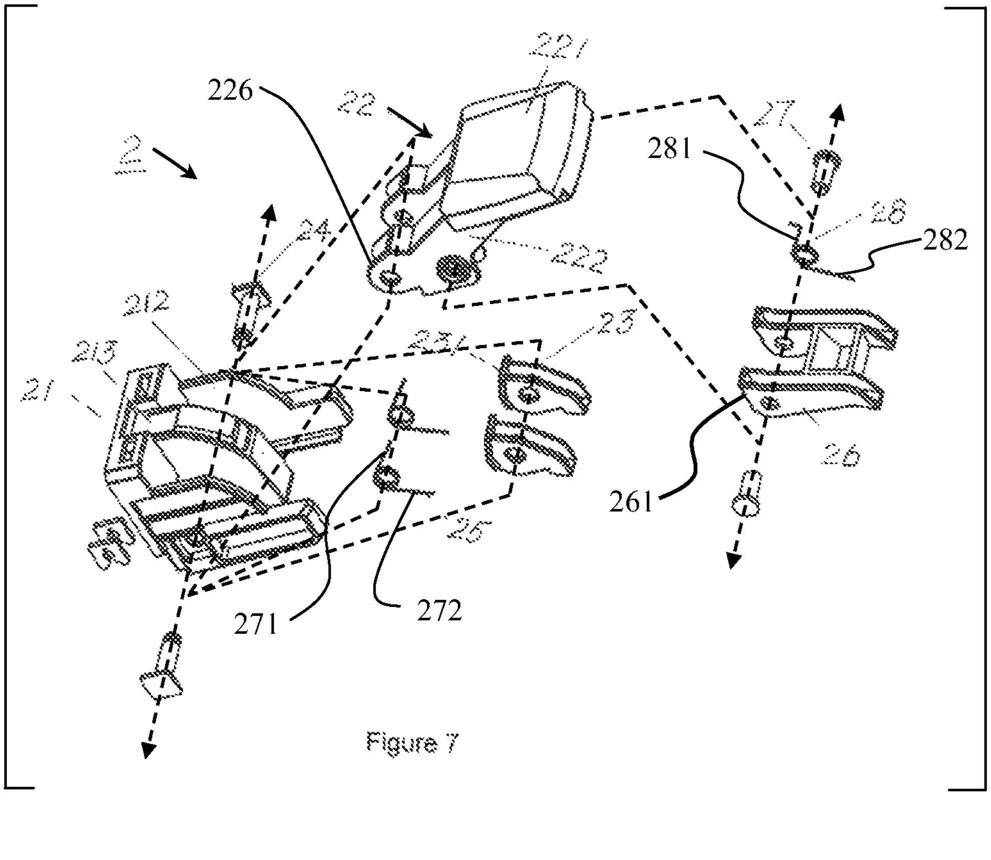
FIG. 7 is an exploded view of the bracket of FIG. 4.
Figure 10:
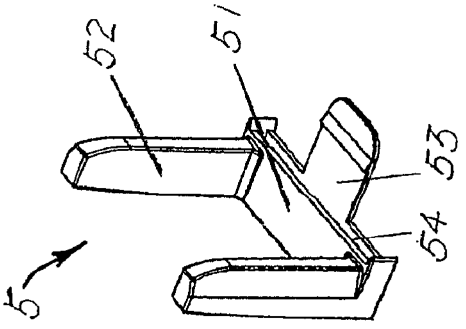
FIG. 10 is a perspective view of a knife holder in the hand-operated cutting apparatus according to the present invention.

As shown in FIGS. 5 and 7, the pusher arm 26 is pivotally mounted on the leg 222 of the handle 22 by means of a pivot 27, and the lower end thereof is located between two teeth of the rack 11. The pivot 27 is disposed from the pivot 24 towards the rear of the main frame. In this example, the pusher arm 26 includes two supporting arms spaced from each other and bridging the central protrusion 213. A tension spring 28 may be provided between the pusher arm 26 and the leg 222, and comprise a central hole mounted on the pivot 27 and two supporting rods 281,282 pressing against the pusher arm 26 and leg 222 respectively. The tension spring 28 tends to enlarge the included angle β between the pusher arm 26 and the leg 222.

A retaining sheet 223 may be formed on the leg 222 near the upper end of the pusher arm 26. When the included angle between the pusher arm 26 and the leg 222 is enlarged to a certain angle, the upper end 261 of the pusher arm 26 may press against the retaining sheet 223, thus the mentioned included angle β could be prevented from being further enlarged.

For the convenience of the orientation of the bracket 2 in the main frame 1, the present hand-operated cutting apparatus may also include a stopper arm 23 pivotally provided on the leg 222 by means of the pivot 24. The lower end of the stopper arm 23 is also located between two teeth of the rack 11. Therefore, comparing to the pusher arm 26, the stopper arm 23 is closer to the front of the main frame 1. In the example shown in FIGS. 5 and 7, the present hand-operated cutting apparatus includes two stopper arms 23. A tension spring 25 may be provided between the leg 222 and each of the stopper arms 23, and comprise a central hole mounted on the pivot 24 and two supporting rods 271,272 pressing against leg 222 and the respective stopper arm 23, respectively. Each tension spring 25 tends to enlarge the included angle α between the leg 222 and the respective stopper arm 23.

An end sheet 231 may be formed at the upper end of each stopper arm 23, and be sized to cover the edge of the lower end of the leg 222. Thus, when the included angle between the leg 222 and the individual stopper arm 23 is enlarged to a certain angle, the end sheet 231 of the individual stopper arm 23 would press against the edge of the lower end of the leg 222, thus the mentioned included angle could be prevented from being further enlarged.

Figure 8:
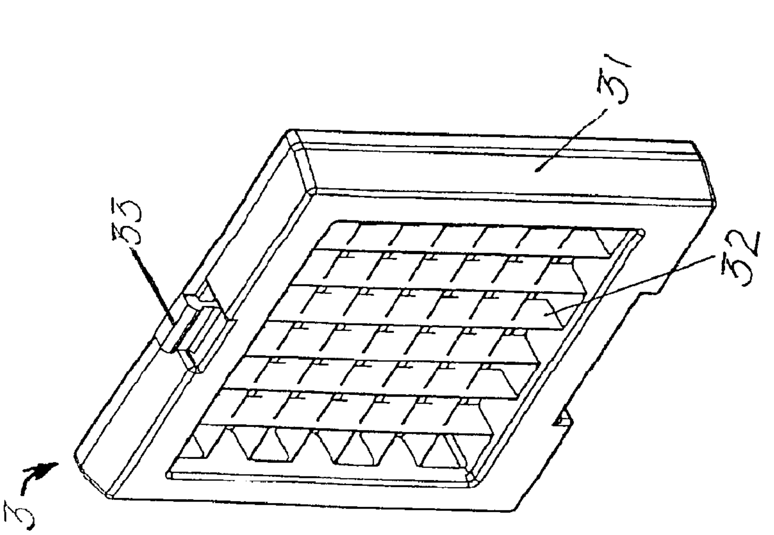
FIG. 8 is a perspective view of a cutter in the hand-operated cutting apparatus according to the present invention.

As shown in FIG. 8, the cutter 3 of the present invention may include a stand 31 and a plurality of cutting blades 32 provided within the stand 31 and crossing each other to form apertures by adjacent cutting blades. To mount the cutter 3 in the front of the main frame 1, a circular groove 14 may be formed in the front wall of the main frame 1 around the opening 13, and at least one side of the circular groove is open to enable the cutter 3 to be inserted into the circular groove. An aligning aperture 141 may be formed at the side of the front wall opposite to the open side of the circular groove, to engage with an aligning projection 33 (see FIG. 8) extended from the stand 31. For example, in FIG. 3, the circular groove 14 is open at the bottom of the front wall, and the aligning aperture 141 is formed at the top side of the front wall. Alternatively, the cutter 3 could be mounted in the front of the main frame 1 by screws, binding agent or any other well-known means.

Figure 9:
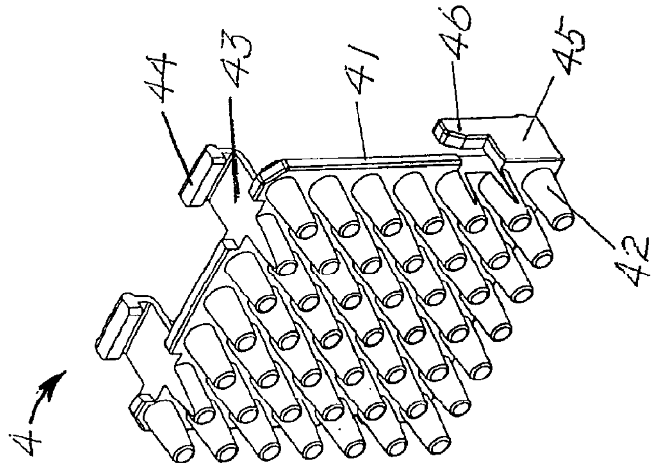
FIG. 9 is a perspective view of a squeezer in the hand-operated cutting apparatus according to the present invention.

FIG. 9 illustrates the squeezer 4 opposite to the cutter 3. The squeezer 4 comprises a substrate 41 and at least a squeezing pole 42 extending forwards from the substrate 41 and corresponding to the apertures formed by the cutting blades 32. For example, the substrate 41 of the squeezer may be attached to the front of the main body 211 of the base 21 by means of screws or binding agent, to enable the squeezing poles 42 to face to the cutter. Alternatively, to detachably attach the squeezer 4 to the bracket 2, a set of upper connecting tabs 43 may be formed at the top of the substrate 41 opposite to the squeezing poles 42, and upper projections 44 may be formed at the end of the respective upper connecting tabs 43. Meanwhile, a lower connecting tab 45 may extend backwards from the lower part of each side of the substrate 41 opposite to the squeezing poles 42, and lower projections 46 may extend upwards from the top of the respective lower connecting tabs 45. Correspondingly, recesses 215 may be formed on the front surface of the main body 211 of the base of the bracket for the insertion of the corresponding upper connecting tabs 43, and a set of connecting holes 216 may be formed at the top side of main body 211 to align with the recesses 215 for the insertion of the upper projections 44. A rim 217 is formed downwards from each side of the main body 211 of the base to form a receiving recession 218 with the other part of the main body 211. The receiving recessions 218 is used to receive the lower projections 46 of the squeezer 4.

Figure 11:
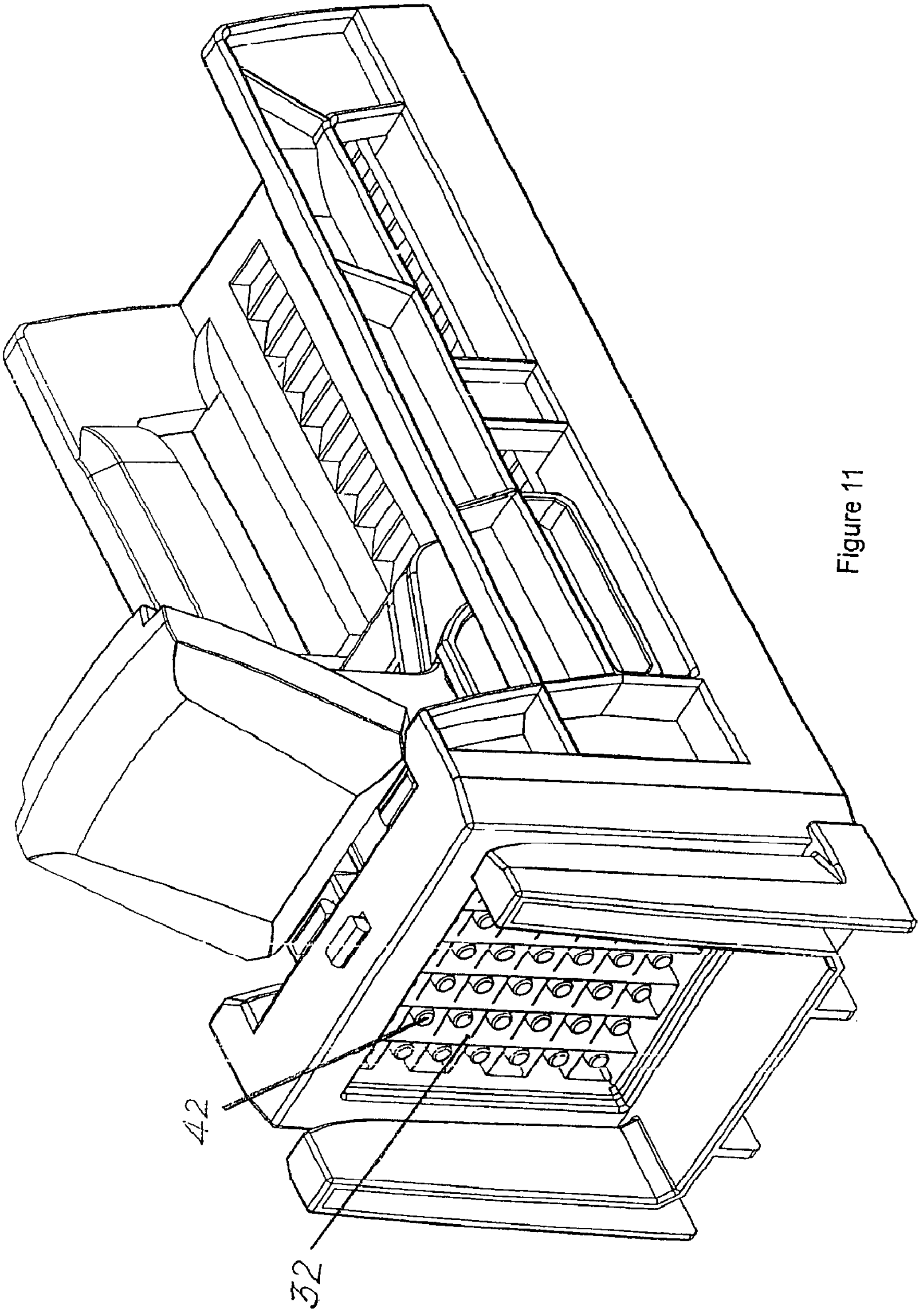
FIG. 11 is a schematic view of the hand-operated cutting apparatus when the squeezer is pressed against the cutter.

The operation of the hand-operated cutting apparatus of the present invention is as follows. Firstly, the object to be cut is placed between the cutter 3 and the squeezer 4, and then the bracket 2 is pushed towards the front wall of the main frame 1 to press the object against the cutting blades 32 of the cutter by means of the squeezer 4 attached to the bracket 2. Then, the pressing piece 211 of the handle 22 is pressed down, thus the handle 22 overcomes the spring force of the tension spring 28 to reduce the included angle between the pusher arm 26 and the leg 222 of the handle. Therefore, the pusher arm 26 pivots with respect to its contacting point with the rack 11, to force the bracket 2 and squeezer 4 to move towards the cutter 3, and in turn the object is further pushed against the cutting blades 32 and cut by the cutting blades 32 to form the desired strips. Subsequently, the pressing piece 221 is released, and the handle 22 is raised by the spring force of the tension spring 28 and rotates upwards around the pivot 24, thus the pivot 27 of the pusher arm 26 is raised at the same time forcing the pusher arm 26 to move forwards, which makes the lower end of pusher arm 26 move forwards by one or more teeth of the rack 11 and be located between two teeth of the rack 11 closer to the front of the main frame 1. With the repetition of the above-mentioned operation, the bracket 2 could be moved step by step towards the cutter 3, thus the object could be gradually pushed into the cutter 3 until the object is completely pushed out of the main frame 1. Finally, as shown in FIG. 11, the squeezing poles 42 of the squeezer 4 engage with the apertures formed by the cutting blades 32.

In the embodiments with the stopper arms 23, when the pusher arm 26 pushes the bracket 2 and squeezer 4 towards the cutter 3, it also pushes the stopper arms 23 to move forwards, thus the lower end of each stopper arm 23 would also move forwards by one or more teeth of the rack to be located between two teeth closer to the front of the main frame 1. Therefore, when the pressing piece 221 is released and the pusher arm 26 rotates upwards together with handle 22, the lower end of each stopper arm 23 is still located between two teeth of the rack to prevent the bracket 2 from moving backwards.

With the completion of the cutting, the squeezer 4 needs to be moved towards the rear of the main frame 1 to be separated from the cutter 3, thus other objects to be cut could be placed therebetween. In this case, the handle 22 may be rotated upwards to make the retaining sheet 223 of the handle press the upper end of the pusher arm 26, and then the pusher arm 26 moves upwards with its pivot 27 to make its lower end disengage with the rack 11. At the same time, the edge 226 of the lower end of the leg 222 press against the end sheet 231 of the individual stopper arm 23, thus the movement of handle 22 also force the stopper arms 23 move upwards to make the lower ends thereof disengage with the rack 11. Therefore, the bracket 2 together with the squeezer 4 could move freely in the main frame 1.

Furthermore, in order to cut the resultant strips of the object squeezed from the cutter 3 into a desired length, a knife holder 5 may be provided in front of the main frame 1 to guide a knife (not shown in the figures) to cut the strips of the object discharged from the main frame 1. The knife holder 5 comprises a foundation 51 and a couple of vertical columns 52 extending upwards from the both sides of the foundation 51. The rear edge of each vertical column is separated from that of the foundation 51, thus, when the knife holder 5 is mounted in front of the main frame 1, a gap is formed between the vertical column 52 and the main frame 1, which enables the knife to move up and down freely along the gap.

The knife holder 5 may further comprise an attaching plate 53 extending from the lower side of the foundation 51 which could attach to the bottom of the main frame 1. In addition, for the orientation of the knife holder 5 with respect to the main frame 1, a coupling groove 54 may be formed on the rear surface of the foundation 51, which could couple with a coupling projection 15 extending outwards from the lower side of the front wall of the main frame 1.

In the above-mentioned embodiments, the central protrusion 212 formed on the main body 211 of the base 21 of the bracket 2 is used to strengthen the present hand-operated cutting apparatus, which could enable the handle 22 to be mounted on the base more stably. However, to simplify the structure of the present invention, the central protrusion 212 could be omitted. Thus, the leg 222 of the handle could be formed into a single piece without the mentioned two branches spaced from each other. At the same time, either the pusher arm or the stopper arm could also be formed into a single piece.

Although many embodiments of the present invention have been shown and described in details, those skilled in the art should understand that various changes and modifications could be made to the embodiments without departing from the principles and spirits of the present invention and they still fall into the scope of claims and the equivalent thereof.

What is claimed is:

1. A hand-operated cutting apparatus comprising:

a main frame at least including a front wall having an opening, a base wall and two side walls, and a rack of teeth is formed on an upper surface of the base wall along the length of the main frame;

a bracket being disposed between the side walls of the main frame and movable along the length of the main frame, the bracket comprising a base, a handle comprising a pressing piece and a leg inclinedly extending from a lower side of the pressing piece towards the front of the main frame, the handle being pivotally mounted on the base by means of a first pivot positioned at a front end of the leg, a pusher arm pivotally mounted on the leg by means of a second pivot positioned at a rear part of the leg, the pusher arm including a lower end movable between two teeth of the rack, wherein the pivot axis of the pusher arm on the leg departs from the pivot axis of the handle on the base towards the rear of the main frame, and a pusher tension spring having a central hole mounted on the second pivot and including two supporting rods pressing against the pusher arm and the leg, respectively, which tends to enlarge an included angle between the pusher arm and the leg;

a cutter provided in the opening in the front wall of the main frame and comprising a cutting blade located within the opening;

a squeezer attached to a front surface of the bracket facing to the cutter;

a stopper arm pivotally mounted on the leg by means of the first pivot, the stopper arm including a lower end located between two teeth of the rack; and a stopper tension spring having a central hole mounted on the first pivot and including two supporting rods pressing against the stopper arm and the leg, respectively, which tends to enlarge an included angle between the stopper arm and the leg.

2. The hand-operated cutting apparatus of claim 1, wherein a sliding groove is formed on an inner surface of each side wall along the length of the main frame, and the base includes a main body and side plates extending backwards from both sides of the main body, in which a sliding block is formed on an outer surface of each of the side plates for engaging with the respective sliding groove.

3. The hand-operated cutting apparatus of claim 2, wherein the base further comprises a central protrusion extending backwards from the center of the main body for supporting the first pivot.

4. The hand-operated cutting apparatus of claim 1, wherein a retaining sheet is formed on the leg near an upper end of the pusher arm, in which when the included angle between the pusher arm and the leg is enlarged to a certain angle, the upper end of the pusher arm presses against the retaining sheet to prevent the included angle from being further enlarged.

5. The hand-operated cutting apparatus of claim 1, wherein an end sheet is formed at an upper end of the stopper arm and is sized to cover the edge of a lower end of the leg, in which when the included angle between the leg and the stopper arm is enlarged to a certain angle, the end sheet of the stopper arm presses against the edge of the lower end of the leg to prevent the included angle from being further enlarged.

6. The hand-operated cutting apparatus of claim 1, wherein the cutter further comprises a stand, and the number of the cutting blades is two or more, in which the cutting blades are provided within the stand and cross each other to form apertures by adjacent cutting blades.

7. The hand-operated cutting apparatus of claim 6, wherein a groove is formed in the front wall of the main frame around the opening, and at least one side of the groove is open to enable the insertion of the stand of the cutter, in which an aligning projection extends outwards from the stand, and an aligning aperture is formed at the side of the front wall opposite to the open side of the groove to enable the insertion of the aligning projection.

8. The hand-operated cutting apparatus of claim 6, wherein the squeezer comprises a substrate and at least a squeezing pole extending forwards from the substrate and corresponding to the apertures formed by the cutting blades.

9. The hand-operated cutting apparatus of claim 8, wherein a set of upper connecting tabs is formed at the top of the substrate opposite to the squeezing pole and upper projections are formed at the end of the respective upper connecting tabs, and a lower connecting tab extends backwards from the lower part of each side of the substrate opposite to the squeezing pole and lower projections extend upwards from the top of the respective lower connecting tabs, and wherein recesses are formed on the front surface of the bracket for the insertion of the corresponding upper connecting tabs, and a set of connecting holes are formed at the top side of the bracket to align with the recesses for the insertion of the upper projections, and a rim is formed downwards from each side of the bracket to form a receiving recession with the other part of the bracket, in which the receiving recessions receive the lower projections of the squeezer.

10. The hand-operated cutting apparatus of claim 6 further comprising a knife holder provided in front of the main frame and having a foundation and a pair of vertical columns extending upwards from the both sides of the foundation, in which the rear edge of each vertical columns is separated from that of the foundation.

11. The hand-operated cutting apparatus of claim 10, wherein the knife holder further comprises an attaching plate extending from the lower side of the foundation for attaching to the bottom of the main frame.

12. The hand-operated cutting apparatus of claim 11, wherein a coupling groove is formed on the rear surface of the foundation, and a coupling projection extends outwards from the lower side of the front wall of the main frame for engaging with the coupling groove.

13. A hand-operated cutting apparatus comprising:

a main frame at least including a front wall having an opening, a base wall and two side walls, and a rack of teeth is formed on an upper surface of the base wall along the length of the main frame;

a bracket being disposed between the side walls of the main frame and movable along the length of the main frame, the bracket comprising a base, a handle comprising a pressing piece and a leg inclinedly extending from a lower side of the pressing piece towards the front of the main frame, the handle being pivotally mounted on the base by means of a first pivot positioned at a front end of the leg, a pusher arm pivotally mounted on the leg by means of a second pivot positioned at a rear part of the leg, the pusher arm including a lower end movable between two teeth of the rack, wherein the pivot axis of the pusher arm on the leg departs from the pivot axis of the handle on the base towards the rear of the main frame;

a cutter provided in the opening in the front wall of the main frame and comprising a cutting blade located within the opening;

a squeezer attached to a front surface of the bracket facing to the cutter;

a stopper arm pivotally mounted on the leg by means of the first pivot, the stopper arm including a lower end located between two teeth of the rack, and an end sheet formed at an upper end of the stopper arm that is sized to cover the edge of a lower end of the leg, in which when an included angle between the leg and the stopper arm is enlarged to a certain angle, the end sheet of the stopper arm presses against the edge of the lower end of the leg to prevent the included angle from being further enlarged between the leg and the stopper arm.

14. The hand-operated cutting apparatus of claim 13 further comprising a pusher tension spring having a central hole mounted on the second pivot and including two supporting rods pressing against the pusher arm and the leg, respectively, which tends to enlarge an included angle between the pusher arm and the leg.

15. The hand-operated cutting apparatus of claim 13 further comprising a stopper tension spring having a central hole mounted on the first pivot and including two supporting rods pressing against the stopper arm and the leg, respectively, which tends to enlarge the included angle between the stopper arm and the leg.

16. The hand-operated cutting apparatus of claim 13, wherein a retaining sheet is formed on the leg near an upper end of the pusher arm, in which when the included angle between the pusher arm and the leg is enlarged to a certain angle, the upper end of the pusher arm presses against the retaining sheet to prevent the included angle from being further enlarged.

* * * * *